(12) United States Patent
Park

(10) Patent No.: US 11,654,886 B2
(45) Date of Patent: May 23, 2023

(54) DRIVING ASSISTANCE SYSTEM AND DRIVING ASSISTANCE METHOD

(71) Applicant: HL KLEMOVE CORP., Incheon (KR)

(72) Inventor: Kyusik Park, Bucheon-si (KR)

(73) Assignee: HL KLEMOVE CORP., Incheon (KR)

( * ) Notice: Subject to any disclaimer, the term of this patent is extended or adjusted under 35 U.S.C. 154(b) by 85 days.

(21) Appl. No.: 17/231,603

(22) Filed: Apr. 15, 2021

(65) Prior Publication Data

US 2021/0323533 A1    Oct. 21, 2021

(30) Foreign Application Priority Data

Apr. 16, 2020    (KR) .......................... 10-2020-0045936

(51) Int. Cl.
*B60W 20/15*    (2016.01)
*B60W 30/16*    (2020.01)

(52) U.S. Cl.
CPC ............ *B60W 20/15* (2016.01); *B60W 30/16* (2013.01); *B60W 2510/244* (2013.01); *B60W 2554/802* (2020.02); *B60W 2556/50* (2020.02)

(58) Field of Classification Search
CPC ...... B60W 20/15; B60W 20/12; B60W 30/16; B60W 30/182; B60W 30/14; B60W 2510/244; B60W 2554/802
See application file for complete search history.

(56) References Cited

U.S. PATENT DOCUMENTS

| 2015/0149059 | A1* | 5/2015 | Choi | B60W 30/143 |
| | | | | 701/96 |
| 2016/0159353 | A1* | 6/2016 | Yun | B60W 30/16 |
| | | | | 701/93 |
| 2016/0368479 | A1* | 12/2016 | Kim | B60W 10/06 |
| 2017/0217424 | A1* | 8/2017 | Park | B60W 20/20 |
| 2020/0353922 | A1* | 11/2020 | Lee | B60W 30/146 |

FOREIGN PATENT DOCUMENTS

| JP | 2000-172998 | A | | 6/2000 |
| JP | 2007-168502 | A | | 7/2007 |
| KR | 10-2014-0003890 | A | | 1/2014 |
| KR | 20140003890 | A | * | 1/2014 |

OTHER PUBLICATIONS

Korean Office Action dated Apr. 23, 2021, in connection with the corresponding Korean Patent Application No. 10-2020-0045936 citing the above reference(s).

* cited by examiner

*Primary Examiner* — George C Jin
(74) *Attorney, Agent, or Firm* — Hauptman Ham, LLP

(57) ABSTRACT

An aspect of the disclosure provides an apparatus and a method for improving fuel efficiency of a plug-in hybrid electric vehicle. The apparatus for assisting driving of a host vehicle includes an input configured to receive an input for activation of a fuel efficiency mode; and a controller configured to: in response to receiving the input for activation of the fuel efficiency mode, determine a control factor for power distribution based on route information received from a navigation device of the host vehicle and a state of a battery, and perform power distribution based on the control factor.

10 Claims, 4 Drawing Sheets

DRIVING ASSISTANCE SYSTEM AND DRIVING ASSISTANCE METHOD

CROSS-REFERENCE TO RELATED APPLICATION(S)

This application is based on and claims priority under 35 U.S.C. § 119 to Korean Patent Application No. 10-2020-0045936, filed on Apr. 16, 2020, the disclosure of which is incorporated herein by reference.

BACKGROUND

1. Field

The disclosure relates to a driving assistance system and a driving assistance method capable of improving fuel efficiency.

2. Description of Related Art

A vehicle may refer to a moving means or transportation means for driving on a road or railway using fossil fuels and/or electricity as a power source.

Vehicles using fossil fuels may exhaust fine dust, water vapor, carbon dioxide, carbon monoxide, hydrocarbons, nitrogen, nitrogen oxides, and/or sulfur oxides due to combustion of fossil fuels. The water vapor and carbon dioxide are known to cause global warming, and fine dust, carbon monoxide, hydrocarbons, nitrogen oxides and/or sulfur oxides are known as air pollutants that can damage humans.

For this reason, the vehicles using eco-friendly energy to replace fossil fuels have recently been developed. For example, a hybrid electric vehicle (HEV) that uses both fossil fuel and electricity, and an electric vehicle (EV) that uses only electricity are being developed.

In a battery of a hybrid vehicle, a state of charge (SOC) is variably controlled by an operation of an engine according to a driving state, but the operation of the engine is flexible, so that the driving state cannot be immediately reflected in a SOC control of the battery. Therefore, the hybrid vehicle has many difficulties in controlling the SOC of the battery.

SUMMARY

An aspect of the disclosure provides a driving assistance system and a driving assistance method for improving fuel efficiency of a plug-in hybrid electric vehicle.

Additional aspects of the disclosure will be set forth in part in the description which follows and, in part, will be obvious from the description, or may be learned by practice of the disclosure.

According to an aspect of the disclosure, there is provided an apparatus for assisting driving of a host vehicle including: an input configured to receive an input for activation of a fuel efficiency mode; and a controller configured to: in response to receiving the input for activation of the fuel efficiency mode, determine a control factor for power distribution based on route information received from a navigation device of the host vehicle and a state of a battery, and perform power distribution based on the control factor.

The controller may be configured to perform the power distribution based on a preset distance between the host vehicle and a preceding vehicle and the control factor.

In response to receiving the input for activating the fuel efficiency mode while a smart cruise control (SCC) mode is activated, the controller may be configured to perform power distribution based on a distance between the host vehicle and the preceding vehicle set in the SCC mode and the control factor.

The controller may be configured to update the distance between the host vehicle and the preceding vehicle and the control factor by reflecting a traffic condition received from the navigation device.

In response to receiving the input for activation of the fuel efficiency mode, the controller may be configured to determine the control factor for power distribution based on route information received from the navigation device, a current state of charge (SOC) of the battery, and a target SOC of the battery.

A vehicle may include the apparatus.

According to another aspect of the disclosure, there is provided a method for assisting driving of a host vehicle including: receiving, by an input, an input for activation of a fuel efficiency mode; in response to receiving the input, determining, by a controller, a control factor for power distribution based on route information received from a navigation device of the host vehicle and a state of a battery; and performing, by the controller, power distribution based on the control factor.

The performing of the power distribution based on the control factor may include performing the power distribution based on a preset distance between the host vehicle and a preceding vehicle and the control factor.

The performing of the power distribution based on the control factor may include, in response to receiving the input for activating the fuel efficiency mode while a smart cruise control (SCC) mode is activated, performing power distribution based on a distance between the host vehicle and the preceding vehicle set in the SCC mode and the control factor.

The method may further include updating, by the controller, the distance between the host vehicle and the preceding vehicle and the control factor by reflecting a traffic condition received from the navigation device.

The determining of the control factor may include, in response to receiving the input for activation of the fuel efficiency mode, determining the control factor for power distribution based on route information received from the navigation device, a current state of charge (SOC) of the battery, and a target SOC of the battery.

According to another aspect of the disclosure, there is provided a non-transitory computer-readable medium storing computer-executable instruction when executed by a processor, to cause an apparatus for assisting driving of a host vehicle to perform: receiving, by an input, an input for activation of a fuel efficiency mode; in response to receiving the input, determining, by a controller, a control factor for power distribution based on route information received from a navigation device of the host vehicle and a state of a battery; and performing, by the controller, power distribution based on the control factor

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
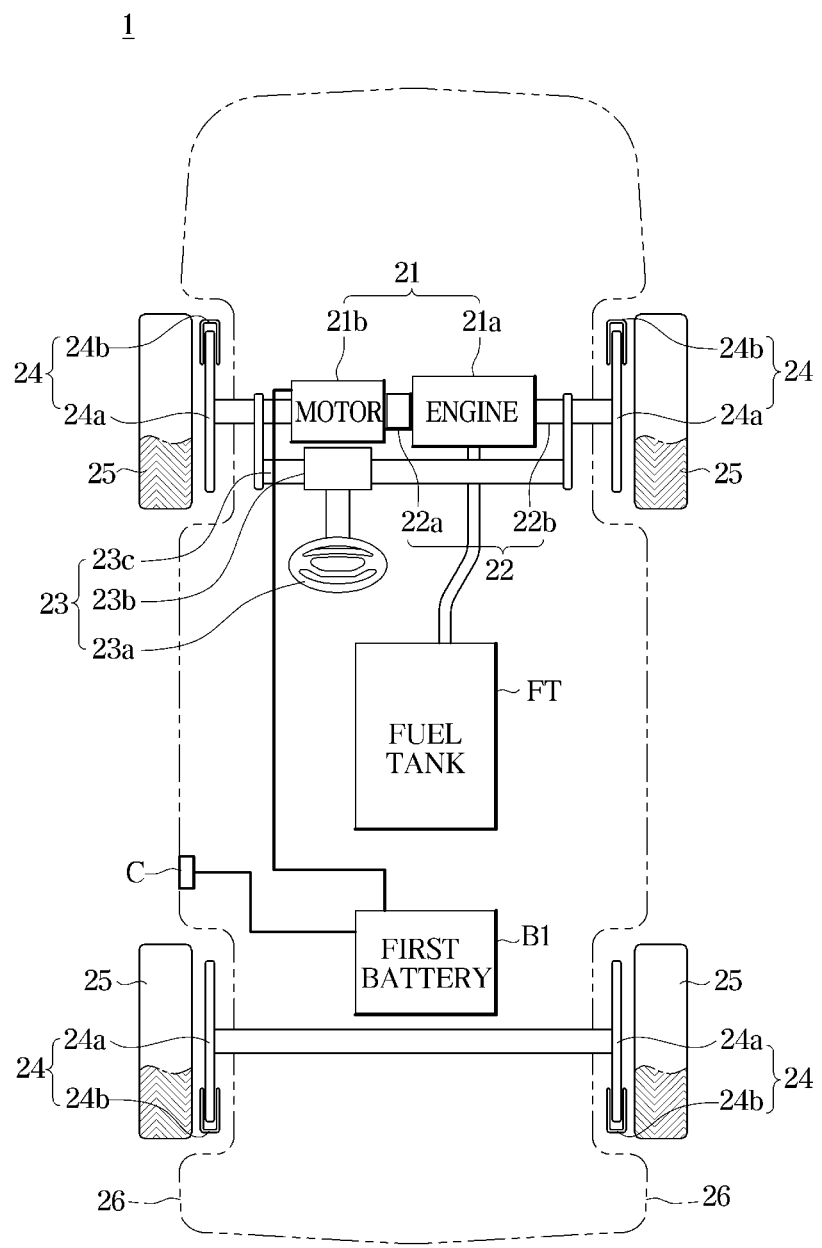
FIG. 1 is a view illustrating a configuration of a vehicle according to an embodiment.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

Throughout the specification, when a member is located "on" another member, this includes not only when one member is in contact with another member but also when another member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, operation principles and embodiments of the disclosure will be described with reference to accompanying drawings.

A vehicle may be a mechanical/electrical device that transports people and/or objects using a turning force (also called rotation power) of an engine and/or a motor.

A vehicle using the engine explosively burns fossil fuels such as gasoline, diesel, gas, etc., converts translational kinetic force generated during combustion of fossil fuels into rotational kinetic force, and may move using the converted turning force. The vehicle using the engine may receive fossil fuels (e.g., gasoline, diesel, etc.) from the outside.

A vehicle using the motor is called an electric vehicle (EV), and converts electric energy stored in a battery into rotational kinetic energy, and may move using the converted turning force. The vehicle using the motor may receive power from the outside.

Some vehicles use both the engine and the motor. Such vehicles are called hybrid electric vehicles (HEVs), and may be moved using the engine as well as the motor. The hybrid vehicles may be classified into general hybrid vehicles that receive only fossil fuel from the outside and generate electric energy using the engine and motor (generator), and plug-in hybrid electric vehicles (PHEVs) that can receive both fossil fuel and electric energy from the outside.

The electric vehicles and the hybrid vehicles generally may include a high-voltage battery for supplying electric energy to a driving motor and a low-voltage battery for supplying electric energy to an electric device (electrical device) component of the vehicle, respectively. For example, the high-voltage battery that supplies electric energy to a drive motor may have an output voltage of approximately several hundred volts (V) (for example, 300V to 400V), and the low-voltage battery that supplies electric energy to the electrical component may have an output voltage of approximately several tens of volts (e.g., 12V).

The electric vehicles and the hybrid vehicles may charge high-voltage batteries while driving. The driving motor may convert electric energy into kinetic energy (turning force) as well as convert kinetic energy (turning force) into electric energy. In other words, the driving motor may function as the motor when electric energy is supplied from the outside, and may function as the generator supplied with the kinetic energy from the outside. When the vehicle drives downhill or decreases by the operation of the drive motor (regenerative braking), the drive motor may generate power, and may charge the high-voltage battery (charging by regenerative braking) using the power generated by the drive motor.

In addition, the electric vehicles and the hybrid vehicles (especially PHEVs) may charge the high-voltage battery from an external power source (e.g., DC power or AC power) while parking. For example, in a charging station, the high-voltage battery of the vehicle may be charged using a commercial DC power source. At home, the high-voltage battery of the vehicle may be charged using a household AC power source.

On the other hand, since the PHEV uses fuel such as gasoline and electric energy from the battery as the power source, a distance that can be driven with the remaining fuel and a distance that can be driven with the remaining amount of the battery are respectively calculated, and a total driving distance may be calculated by summing the calculated two driving distances.

In particular, the PHEV is a concept in which a short distance drives in an EV mode (CD mode: Charge Depleting mode) and is converted to an HEV mode (CS mode: Charge Sustaining mode) above that. First, it drives in the CD mode that uses electric energy, and when a state of charge (SOC) of the battery reaches a specified threshold, it switches to the CS mode that maintains the SOC by using the engine together.

However, an existing CD-CS mode does not consider battery efficiency and power distribution, so it is not effective for fuel efficiency. In order to compensate for this, although optimal control such as Dynamic programming (DP) and Pontryagin's Minimum Principle (PMP) are being considered, it is difficult to apply this to real-time control because it is difficult to obtain an optimal control factor.

Hereinafter, a driving assistance system and a driving assistance method for improving fuel efficiency in PHEV will be described in detail.

Figure 2:
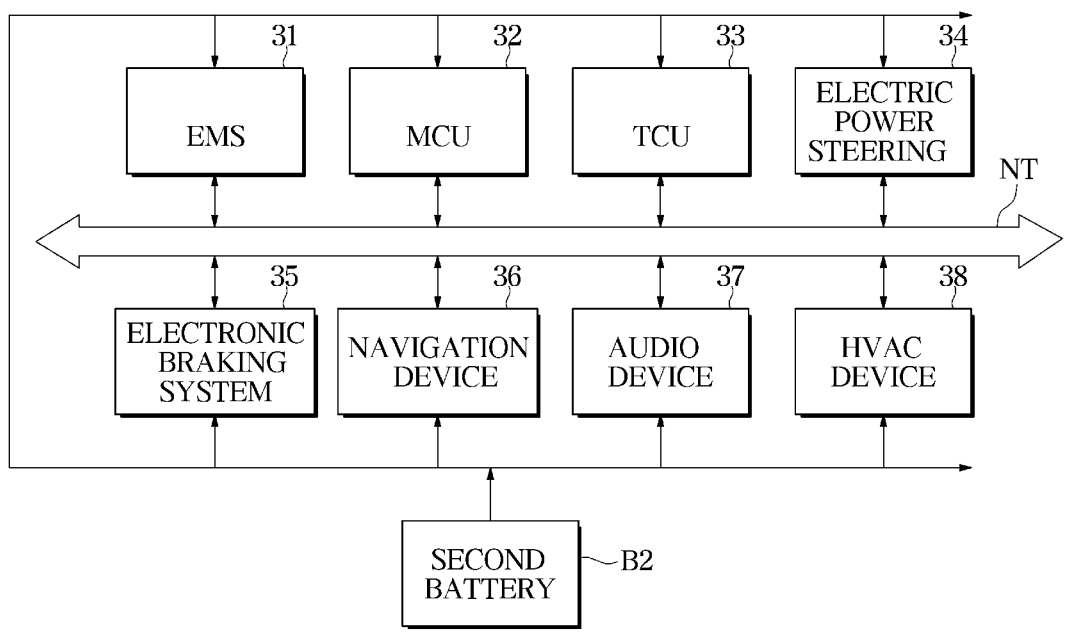
FIG. 2 is a view illustrating an electrical component of a vehicle according to an embodiment.

FIG. 1 is a view illustrating a configuration of a vehicle according to an embodiment, and FIG. 2 is a view illustrating an electrical component of a vehicle according to an embodiment.

FIG. 1 illustrates the hybrid vehicle (in particular, PHEV).

Referring to FIG. 1, a vehicle 1 may include a power generating device 21 that generates power, a power transmission device 22 that transmits power, and a steering device 23 for controlling a driving direction of the vehicle 1, a braking device 24 for stopping the vehicle 1, and wheels 25 for moving the vehicle 1. Further, a chassis 20 may further includes the power generating device 21, the power transmission device 22, the steering device 23, the braking device 24, and a frame 26 for fixing the wheels 25.

The power generating device 21 may generate the turning force for the vehicle 1 to drive, and may include an engine 21a, a fuel tank FT, an exhaust device, a motor 21b, a first battery B1, and a charging circuit C, and the like.

The power transmission device 22 may transmit the turning force generated by the power generating device 21 to the wheels 25, and may include a transmission 22a, a shift lever, a differential device, and a drive shaft 22b.

The steering device 23 may control the driving direction of the vehicle 1, and may include a steering wheel 23a, a steering gear 23b, a steering link 23c, and the like.

The braking device 24 may stop turning of the wheels 25, and may include a brake pedal, a master cylinder, a brake disk 24a, a brake pad 24b, and the like.

The wheels 25 may receive the turning force from the power generating device 21 through the power transmission device 22 and may move the vehicle 1. The wheels 25 may include front wheels provided at the front of the vehicle 1 and rear wheels provided at the rear of the vehicle 1.

The vehicle 1 may include both the engine 21a and the motor 21b for generating the turning force. The vehicle 1 may include the fuel tank FT for supplying fossil fuel to the engine 21a and the first battery B1 which is a high-voltage battery for supplying power to the motor 21b. In addition, the charging circuit C for charging the first battery B1 from the external power source may be provided.

Referring to FIG. 2, the vehicle 1 may include an engine management system (EMS) 31, a motor control unit (MCU) 32, a transmission control unit (TCU) 33, an electronic braking system 34, and electric power steering 35, a navigation device 36, an audio device 37, a heating/ventilation/air conditioning (HVAC) device 38.

The electrical components 30 may communicate with each other through a vehicle communication network NT. For example, the electrical components 30 may exchange data through Ethernet, MOST (Media Oriented Systems Transport), Flexray, CAN (Controller Area Network), LIN (Local Interconnect Network), etc.

Also, the electrical components 30 may receive power from a second battery B2, which is a low-voltage battery.

The second battery B2 may be provided separately from the first battery B1 illustrated in FIG. 2 above.

For example, the first battery B1 may supply power to the motor 21b driving the vehicle 1, and may output a voltage of several hundreds of volts (V) (e.g., 200 V to 800 V) to supply power to the motor 21b. In addition, the second battery B2 may supply power to the electrical components 30, and may output a voltage of several tens of volts (V) (e.g., 12V to 24) to supply power to the electrical components 30. In other words, the first battery B1 and the second battery B2 may be separately provided in order to supply power to the motor 21b and the electrical components 30 receiving power from different voltages, respectively.

In addition, the first battery B1 may supply power to the motor 21b, and the first battery B1 may be charged by the motor 21b.

For example, while the vehicle 1 is going downhill, the vehicle 1 may drive by gravity and/or inertia, and the turning force of the wheels 25 may be transmitted to the motor 21b through the power transmission device 22. The motor 21b may generate electric energy from the turning force transmitted from the wheels 25, and the electric energy generated by the motor 21b may be stored in the first battery B1.

As another example, when a driver stops the vehicle 1 or decelerates a driving speed of the vehicle 1, the motor 21b may generate a regenerative braking force for decelerating the vehicle 1, and may generate the electric energy by a regenerative brake. The electric energy generated by the motor 21b may be stored in the first battery B1.

Figure 3:
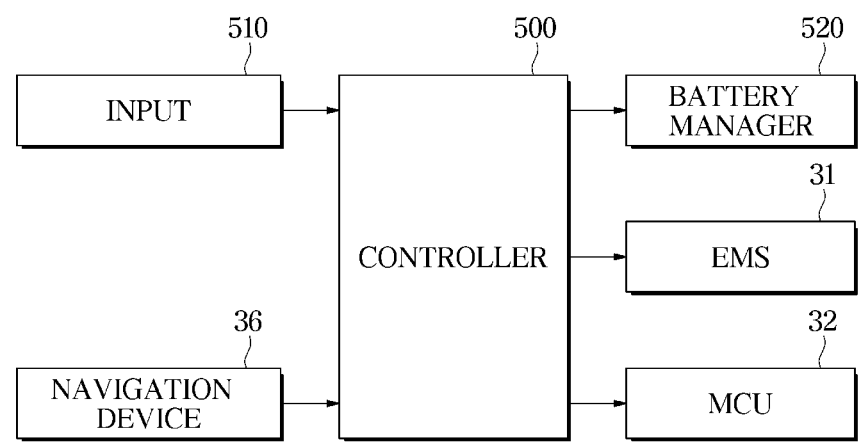
FIG. 3 is a view illustrating a configuration of a driving assistance system according to an embodiment.

FIG. 3 is a view illustrating a configuration of a driving assistance system according to an embodiment.

Referring to FIG. 3, a driving assistance system may include an input 510, the navigation device 36, a battery manager 520, an engine management system (EMS) 31, the motor control unit (MCU) 32, and a controller 500.

The input 510 may receive an input for activating a smart cruise control (SCC) mode and an input for activating a fuel efficiency mode in a state in which the SCC mode is activated. The input 510 may be an input provided in the head unit or an input provided in a center fascia.

In a situation in which the SCC mode is activated, the controller 500 may receive route information of a driving route from the navigation device 36 when the input for activating the fuel efficiency mode is received through the input 510. For example, the controller 500 may obtain route information including a set speed, an average speed, a remaining distance, a road gradient, and a traffic condition through the navigation device 36. In the situation in which the SCC mode is activated, when the input for activating the fuel efficiency mode is received, there is an advantage of being free in power distribution because the driver's intervention is eliminated.

In addition, the controller 500 may communicate with the battery manager 520 and receive information on the SOC of the battery from the battery manager 520. The controller 500 may determine a control factor for power distribution based on a current SOC and a target SOC of the battery received from the battery manager 520. For example, the controller 500 may determine, as the control factor, maximizing regenerative braking by using road gradients at an entrance and an exit of a toll gate based on the current SOC and the target SOC of the battery.

The controller 500 may distribute power based on the determined control factor and a distance between vehicles set in the SCC mode. The controller 500 may update a distance between vehicles set in the existing SCC to a distance that can maximize the efficiency of the battery and regenerative braking in real time, and may determine acceleration and deceleration of the vehicle 1 to maintain the distance between vehicles accordingly.

The controller 500 may update the control factor and the distance between vehicles by reflecting information about the changing traffic conditions from the navigation device 36 in real time. The controller 500 may perform power distribution based on the updated control factor and the distance between vehicles by reflecting the traffic condition in this way.

Figure 4:
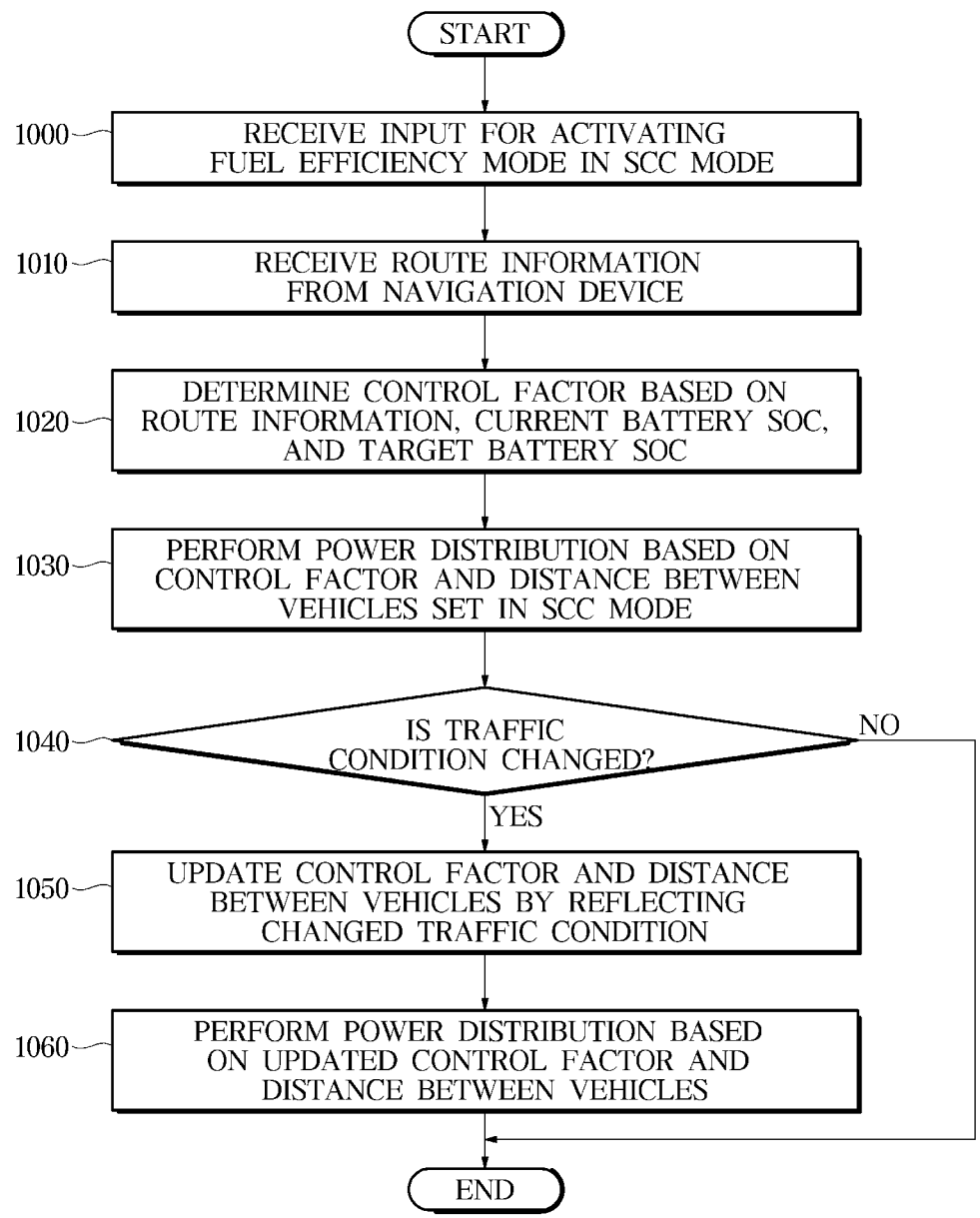
FIG. 4 is a view illustrating a driving assistance method according to an embodiment.

FIG. 4 is a view illustrating a driving assistance method according to an embodiment.

Referring to FIG. 4, when the SCC mode is activated and the input for activating the fuel efficiency mode is received through the input 510 (1000), the controller 500 may receive the route information of the driving route from the navigation device 36 (1010).

For example, the controller 500 may obtain the route information including the set speed, the average speed, the remaining distance, the road gradient, and the traffic condition through the navigation device 36. In the situation in which the SCC mode is activated, when the input for activating the fuel efficiency mode is received, there is the advantage of being free in power distribution because the driver's intervention is eliminated.

The controller 500 may determine the control factor based on the route information, the current battery SOC and the target battery SOC (1020).

The controller 500 may communicate with the battery manager 520 and receive information about the SOC of the battery from the battery manager 520. The controller 500 may determine the control factor for power distribution based on the current SOC and target SOC of the battery received from the battery manager 520. For example, the controller 500 may determine, as the control factor, maximizing regenerative braking by using the road gradients at the entrance and the exit of the toll gate based on the current SOC and the target SOC of the battery.

The controller 500 may perform the power distribution based on the determined control factor and the distance between vehicles set in the SCC mode (1030). The controller 500 may update the distance between vehicles set in the existing SCC to the distance that can maximize the efficiency of the battery and regenerative braking in real time, and may determine the acceleration and deceleration of the vehicle to maintain the distance between vehicles accordingly.

When the traffic condition changes (1040), the controller 500 may update the control factor and the distance between vehicles by reflecting the changed traffic condition (1050), and may perform the power distribution based on the updated control factor and the distance between vehicles (1060).

The controller 500 may update the control factor and the distance between vehicles by reflecting information about the changing traffic conditions from the navigation device 36 in real time. The controller 500 may perform the power distribution based on the updated control factor and the distance between vehicles by reflecting the traffic condition in this way.

According to the disclosure, the fuel efficiency of the plug-in hybrid electric vehicle may be improved.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a non-transitory computer-readable recording medium.

The non-transitory computer-readable recording medium may include all types of recording media storing commands that may be interpreted by a computer. For example, the non-transitory computer-readable recording medium may be, for example, ROM, RAM, a magnetic tape, a magnetic disc, flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. An apparatus for assisting driving of a host vehicle, the apparatus comprising:
   an input configured to receive an input for activation of a fuel efficiency mode; and
   a controller configured to:
      in response to receiving the input for activation of the fuel efficiency mode, determine a control factor for power distribution based on route information received from a navigation device of the host vehicle and a state of a battery, and
      perform power distribution based on the control factor,
   wherein, in response to receiving the input for activation of the fuel efficiency mode, the controller is configured to determine the control factor for power distribution based on route information received from the navigation device, a current state of charge (SOC) of the battery, and a target SOC of the battery.

2. The apparatus according to claim 1, wherein the controller is configured to perform the power distribution based on a preset distance between the host vehicle and a preceding vehicle and the control factor.

3. The apparatus according to claim 1, wherein, in response to receiving the input for activating the fuel efficiency mode while a smart cruise control (SCC) mode is activated, the controller is configured to perform power distribution based on a distance between the host vehicle and the preceding vehicle set in the SCC mode and the control factor.

4. The apparatus according to claim 3, wherein the controller is configured to update the distance between the host vehicle and the preceding vehicle and the control factor by reflecting a traffic condition received from the navigation device.

5. A vehicle comprising an apparatus for assisting driving of the host vehicle, wherein the apparatus comprises:
   an input configured to receive an input for activation of a fuel efficiency mode; and
   a controller configured to:
      in response to receiving the input for activation of the fuel efficiency mode, determine a control factor for power distribution based on route information received from a navigation device of the host vehicle and a state of a battery, and
      perform power distribution based on the control factor,
   wherein, in response to receiving the input for activation of the fuel efficiency mode, the controller is configured to determine the control factor for power distribution based on route information received from the navigation device, a current state of charge (SOC) of the battery, and a target SOC of the battery.

6. A method for assisting driving of a host vehicle, the method comprising:
   receiving, by an input, an input for activation of a fuel efficiency mode;
   in response to receiving the input, determining, by a controller, a control factor for power distribution based on route information received from a navigation device of the host vehicle and a state of a battery;

performing, by the controller, power distribution based on the control factor; and in response to the received input for activation of the fuel efficiency mode, determining the control factor for power distribution based on route information received from the navigation device, a current state of charge (SOC) of the battery, and a target SOC of the battery.

7. The driving assistance method according to claim 6, wherein the performing of the power distribution based on the control factor comprises:

performing the power distribution based on a preset distance between the host vehicle and a preceding vehicle and the control factor.

8. The driving assistance method according to claim 6, wherein the performing of the power distribution based on the control factor comprises:

in response to receiving the input for activating the fuel efficiency mode while a smart cruise control (SCC) mode is activated, performing power distribution based on a distance between the host vehicle and the preceding vehicle set in the SCC mode and the control factor.

9. The driving assistance method according to claim 6, further comprising:

updating, by the controller, the distance between the host vehicle and the preceding vehicle and the control factor by reflecting a traffic condition received from the navigation device.

10. A non-transitory computer-readable medium storing computer-executable instruction when executed by a processor, to cause an apparatus for assisting driving of a host vehicle to perform:

receiving, by an input, an input for activation of a fuel efficiency mode;

in response to receiving the input, determining, by a controller, a control factor for power distribution based on route information received from a navigation device of the host vehicle and a state of a battery;

performing, by the controller, power distribution based on the control factor; and in response to the received input for activation of the fuel efficiency mode, determining the control factor for power distribution based on route information received from the navigation device, a current state of charge (SOC) of the battery, and a target SOC of the battery.

\* \* \* \* \*